(12) United States Patent
Oz (10) Patent No.: US 8,806,328 B2
(45) Date of Patent: Aug. 12, 2014

(54) CLIENT APPLICATION FOR IDENTIFICATION OF UPDATES IN SELECTED NETWORK PAGES

(75) Inventor: Ron Oz, Rishon Lezion (IL)

(73) Assignee: Korss Advanced Solutions Ltd., Rishon-Lezion (IL)

( * ) Notice: Subject to any disclaimer, the term of this patent is extended or adjusted under 35 U.S.C. 154(b) by 1507 days.

(21) Appl. No.: 11/758,036

(22) Filed: Jun. 5, 2007

(65) Prior Publication Data

US 2008/0263439 A1   Oct. 23, 2008

Related U.S. Application Data

(60) Provisional application No. 60/907,912, filed on Apr. 23, 2007.

(51) Int. Cl.
*G06F 17/00* (2006.01)
*G06F 17/30* (2006.01)

(52) U.S. Cl.
USPC ............................ 715/234; 707/754; 707/755

(58) Field of Classification Search
CPC .................................................. G06F 17/2288
USPC ................... 715/205, 234, 760; 707/754–755
See application file for complete search history.

(56) References Cited

U.S. PATENT DOCUMENTS

| | | | |
|---|---|---|---|
| 6,029,182 A * | 2/2000 | Nehab et al. ................... | 715/205 |
| 6,834,306 B1 * | 12/2004 | Tsimelzon ...................... | 715/234 |
| 6,976,210 B1 | 12/2005 | Silva et al. | |
| 7,562,287 B1 * | 7/2009 | Goldstein et al. ............... | 715/201 |
| 7,680,810 B2 * | 3/2010 | Marcjan et al. ................. | 707/722 |
| 2006/0085731 A1 * | 4/2006 | Cui et al. ......................... | 715/234 |
| 2006/0168510 A1 * | 7/2006 | Bryar et al. ..................... | 715/511 |
| 2006/0217111 A1 * | 9/2006 | Marolia et al. ................. | 455/418 |
| 2006/0230021 A1 * | 10/2006 | Diab et al. ......................... | 707/3 |
| 2006/0265503 A1 * | 11/2006 | Jones et al. ..................... | 709/227 |
| 2007/0130518 A1 * | 6/2007 | Shavit et al. ................... | 715/530 |
| 2007/0150502 A1 * | 6/2007 | Bloebaum et al. ............. | 707/102 |
| 2008/0010294 A1 * | 1/2008 | Norton et al. .................... | 707/10 |
| 2008/0071929 A1 * | 3/2008 | Motte et al. .................... | 709/246 |
| 2008/0209000 A1 * | 8/2008 | Schmidt ......................... | 709/207 |
| 2008/0263439 A1 * | 10/2008 | Oz ................................... | 715/235 |
| 2009/0055727 A1 * | 2/2009 | Hansen et al. ................. | 715/234 |

OTHER PUBLICATIONS

'Create a Web page template', Microsoft Office FrontPage 2003, 2011, http://office.microsoft.com/en-us/frontpage-help/.*

* cited by examiner

*Primary Examiner* — Chau Nguyen (57) ABSTRACT

A client software application that enables identification of updates in well-formatted as well as not-well-formatted network pages, where the pages' items and fields may be selected by a user. The client application comprises: a user interface, business logic, and a database. The client application distinguishes between news channels (NC) pages that are constructed as a data list and content modification channels (CMC). The client application allows the user to create templates where those templates define the parts of the items in the page that will be checked for updates by the application.

18 Claims, 10 Drawing Sheets

CLIENT APPLICATION FOR IDENTIFICATION OF UPDATES IN SELECTED NETWORK PAGES

CROSS-REFERENCE TO RELATED APPLICATIONS

This application claims the benefit under 35 U.S.C. §119 (e) of U.S. Provisional Patent Application No. 60/907,912 filed Apr. 23, 2007, the content of which is incorporated by reference herein.

FIELD OF THE INVENTION

The present invention generally relates to the field of software applications. More specifically, the present invention relates to the field of software applications that provide network pages' content updates-management.

BACKGROUND OF THE INVENTION

Websites, spread through the internet, provide various types of content formats. The websites may be updated on various time-frequencies. To see the new updates of a chosen website, users may be required to re-enter the website on occasions and search through browsing the websites' pages or search through a main page that includes tittles to see if any title had been changed. For example, a news website, such as "Times" website in which the main page comprises most of the titles of the subjects and most the titles of the articles. A user that wishes to see updates only in the sports section may be required to enter the "Times" website occasionally to see if there are any new articles in the sports section.

Today there are protocols that allow automatic reading of the updated parts of a website, such as Rich Site Summary (RSS) protocol that allows automatic retrieving of updated content, called "RSS feeds". However, the RSS protocol can only be used with websites that include RSS channels, providing that the user has an RSS application installed in his (or her) computer.

RSS readers or "aggregators" are software applications that usually use RSS or Extensible Markup Language (XML) formatted data to execute the updates check—when comparing the XML code of the saved data with the updated one, at predetermined time intervals.

A U.S. Pat. No. 6,976,210 by FREIRE SILVA JULIANA, ANUPAM VINOD, BREITBART YURI J and KUMAR BHARAT ("F.A.B.K"), discloses a system and a method for creating a personal web view by creating a plurality of web clippings. The personal web view contains a plurality of elements that are taken from source pages and clipped to the web view. The elements can be selected by the user using an interface. F.A.B.K allow updating the personal web view, using a predetermined update frequency.

Although F.A.B.K's solution allows analyzing the actual HTML code of the source web pages, the analysis is carried out by translating the pages' Hyper Text Markup Language (HTML) code to an Extensible Markup Language (XML) code. Since many of the HTML pages are not well formatted, due for example, for missing tags, F.A.B.K disclose a method by which the HTML code of the pages are translated to XML code [F.A.B.K, paragraph 0030]. This leads to translating or identifying and displaying only the "valid" elements from the HTML code.

To allow the user to mark the elements from the source page, the system of F.A.B.K displays the XML code or the Document Object Module (DOM) tree of the source page and while the user selects the elements or "objects" from the display of the DOM tree—the selected elements are highlighted in the display of the source page [F.A.B.K, paragraph 0030]. Since the DOM tree is a display of the XML code—the excluded not-well-formatted HTML elements are also excluded from the display of the DOM tree.

F.A.B.K's invention does not allow handling of not-well-formatted HTML code elements and therefore may leave out some of the content of the page. Furthermore, F.A.B.K's analysis of the source pages does not allow the user to select one element or item from a preset list of items (defined as so in the HTML code) to set up the update check of the entire list. The invention's analysis engine does not identify other elements of the same data list according to a selection of a part of the said list. According to F.A.B.K the user has to specifically select each element from the page (selecting through the DOM tree) of which the user wishes to view updates from.

Additionally many of the source web pages include scripts such as java scripts, VB scripts and the like) to render content to the page. The data that is rendered to the HTML code of the source web page does not appear as normal or "well-formatted" HTML tags. Since F.A.B.K convert the HTML to XML it will skip any scripts that the page contains along with other parts of the page's HTML code that are not well formatted.

SUMMARY OF THE INVENTION

The present invention is a system and a method for automatic identification and representation of updates of network web pages through a software client application. The client application may enable identifying, retrieving and representing updates from websites that include RSS feeds as well as websites that do not include the RSS feeds. The client application comprises a user interface, business logic and a database.

According to some embodiments of the present invention, the client application may identify updates in well-formatted as well as in not-well-formatted parts of network pages. The client application may comprise a user interface, a database and business logic.

Websites on the network, such as internet sites, are usually comprised of web pages, where each page may contain data lists defined herein as items lists. The lists may be divided into smaller items that can be identified and distinguished by the code the page is scripted in (e.g. HTML code). Each item may comprise of parts that can too be recognized by the code where these parts are defined herein as "fields".

Web pages may contain scripts such as, for example, java scripts. The scripts may add interactive functions to Hyper Text Markup Language (HTML) pages or link to other scripts.

According to embodiments of the present invention, the application's business logic comprises an analysis engine and a news template creation engine. The analysis engine may enable identification of item lists, items and fields of a selected page. A user may choose, for example, a web site page using the user's interface, where upon selecting the page; the application may execute a page analysis through the analysis engine. The analysis may include identifying the entire page's scripts, item lists, items and fields and their location in the page. The analysis engine may further identify the "properties" of each field—for example—the HTML code of the fields—identified according to predefined coding indicators.

Additionally, the application may comprise a news template creation engine that allows creating a template using the user interface tools, to allow the user to create a template by which the updates of a certain page or a group of pages may be checked and identified. For example, the user interface may allow the user to mark items and fields of the selected page—where the application allows checking the parts of the page that relate to the selected items and fields chosen by the user. For example, upon marking one item out of an item list, the application may be able to check for updates through the entire item list.

According to some embodiments of the present invention, the updates check may be carried out by creating a template of the HTML code of the marked item and/or its fields (previously analyzed by the analysis engine along with the entire page), indicating the parts of the code that can be read as a template and comparing those parts of the code with similar fields of other items on the same list. An update may be identified and defined by the application if the comparison of the parts with the template yields differences that are recognized by the system as updates.

BRIEF DESCRIPTIONS OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein.

The drawings together with the description make apparent to those skilled in the art how the invention may be embodied in practice.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

DETAILED DESCRIPTIONS OF SOME EMBODIMENTS OF THE INVENTION

Figure 1:
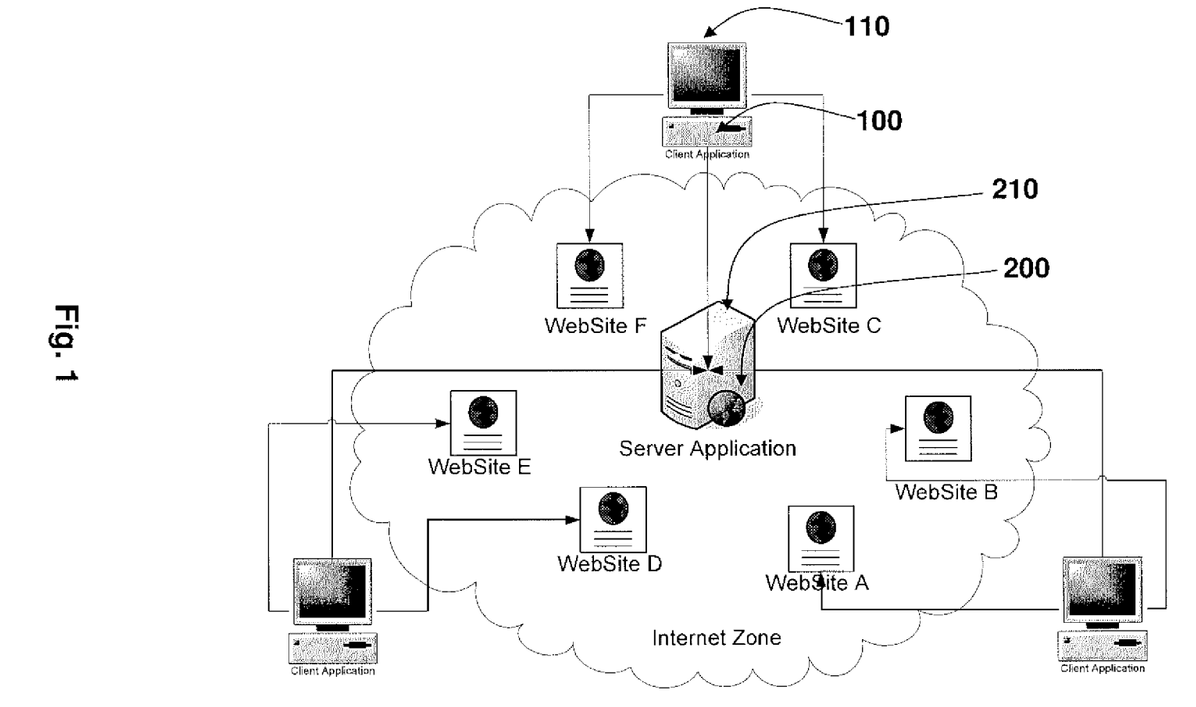
FIG. 1 is a schematic illustration of a layout of client applications communication with a server application, according to embodiments of the present invention.

The present invention is a system and a method for automatic identification and representation of updates of web pages through a software client application 100. Client application 100 may be installed in a user's personal computer 110, wherein computer 110 is connected to a web-based communication network. Client application 100 may communicate with a server 210 that may have a server application 200, according to some embodiments of the present invention, as illustrated in FIG. 1. Server application 200 may be used for storing information relating to the client applications 100 and for automatically updating the users' client applications 100 in case a new version of the software is issued.

According to some embodiments of the present invention, client application 100 is a software application that resides in a user's desktop. Client application 100 enables reading RSS feeds, as well as pages that are not RSS based. Client application 100 may run continuously on the user's computer 110 and enable identifying and retrieving of updated contents of network pages and presenting of at least part of these updates, according to the user's selected parameters. Client application 100 may retrieve and identify updates from RSS feeds or updates from other types of pages that are structured as a data list as well as retrieving and identifying pages that are structured as content data. Client application 100 may notify the user when a new update is identified through a notification message such as a popup window, a voice message and the like.

While the description below contains many specifications, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

Figure 2:
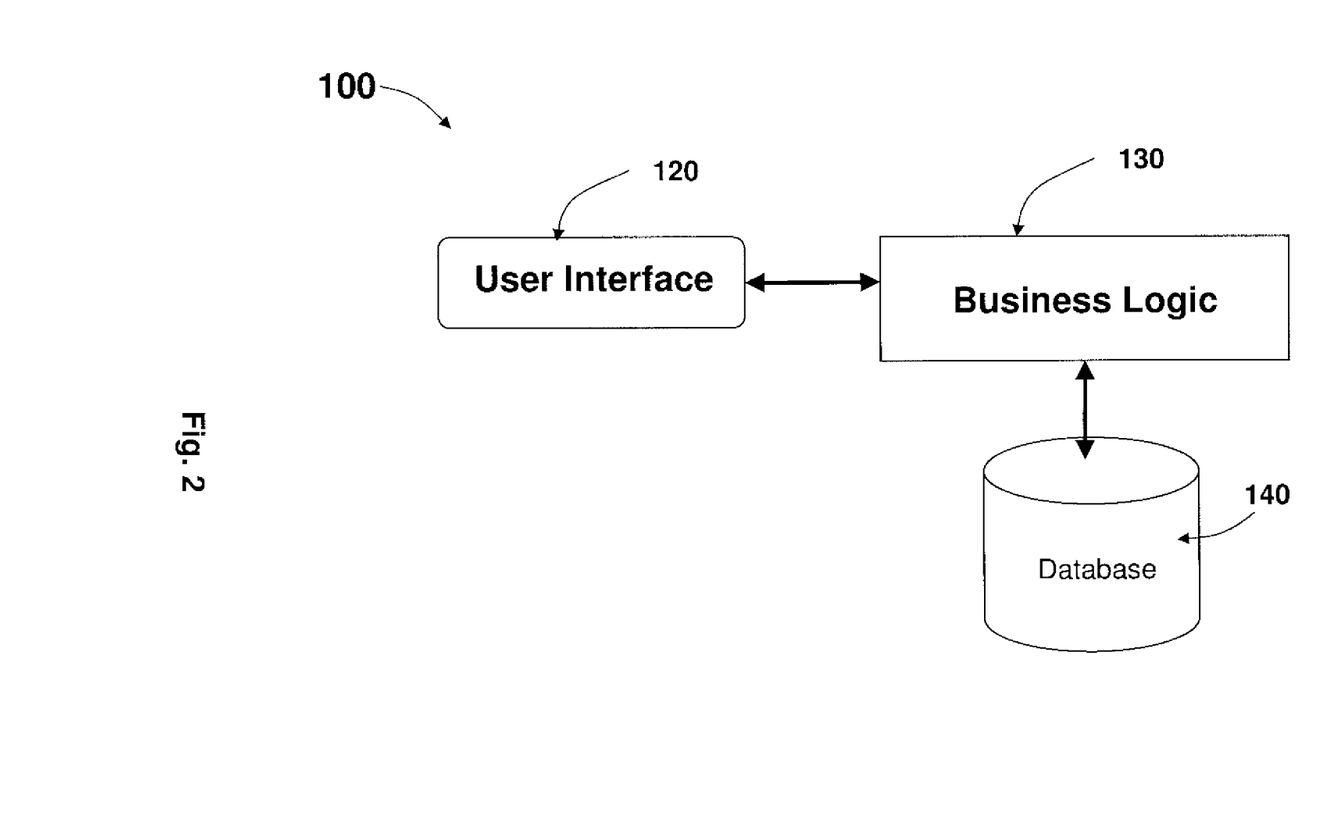
FIG. 2 is a schematic illustration of a client application's architecture, according to some embodiments of the present invention.

FIG. 2 schematically illustrates client application 100 general architecture, according to some embodiments of the present invention. Client application 100 comprises a user interface 120, business logic 130 and a database 140. User interface 120 allows the user to select the network pages and parts of their items and other parameters, where client application 100 may check for updates in those pages, according to the user's selected parameters. Business logic 130 includes the algorithms and logistic functions that enable the operation of client application 100, such as managing of data, saving, retrieving and storing of data and creating templates of selected network pages' items for which client application 100 will identify updates. Business logic 130 enables online searching through the network pages to identify updates of items that were selected by the user and saved as templates or as content data.

Client application 100 distinguishes between two types of sources, for which it may retrieve updates. Those sources are simply defined as "channels". A channel may be at least one page or at least one RSS feed.

Figure 3:
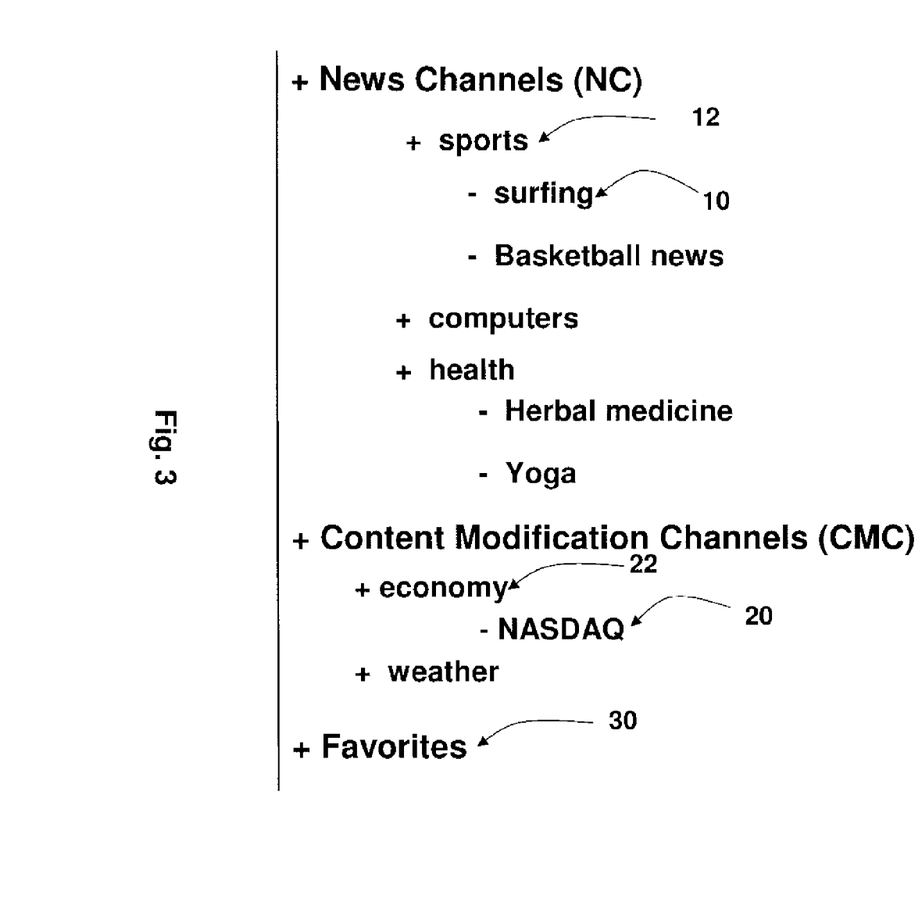
FIG. 3 is a schematic illustration of a channeling in a client application, according to some embodiments of the present invention.

FIG. 3 schematically illustrates client application 100 channeling, according to some embodiments of the present invention. The two types of channels are defined herein as a News Channel (NC) 10 and a Content modification Channel (CMC) 20. NC 10 may be an RSS feed or a page that contains item lists. CMC 20 may be a page that contains occasional updated content. NC 10 may be divided into sub-channels, where every sub-channel is a single source of NC 10. The channels may be combined into NC category 12 and a CMC category 22, where category 12 or 22 may be a physical union of a few channels of the same type—meaning a few NCs 10 or a few CMCs 20. Additionally or alternatively, the channels may be combined into Channel Groups (CG) where each group may contain channels of both NC 10 and CMC 20 types. Categories 12 and 22, sub-channels and GCs may be defined and titled by the user, using user interface 120. The user may be enabled to sort his list of channels by his own classifications, rather than by the channels' type using the channel grouping option.

Each NC 10 comprises at least one page; each page may comprise news items and item lists. For example, a page of football that relates to a news website. The football page comprises several news items of several item lists: a gossip column, a brief of a game and the like. The items comprise of "fields" such as headline, title, summary, author and the like. The optional fields may be the same fields for all items.

According to embodiments of the present invention, client application 100 may further provide a favorites 30 option, in which the user may integrate a number of channels and/or a number of categories. Favorites 30 may be an option that allows the user to aggregate a few NCs 10 of different categories into categories of favorites that are arranged by the user.

According to embodiments of the present invention, client application 100 may enable the user to create a template for NCs 10. The user may select an item out of an item list, using user interface 120 and mark fields within the items. The selected fields will be checked by client application 100 for updates. If there are several items in the same list of items, client application 100 may identify the entire list according to fields-selection of only one or two items from that list.

Once a news update is identified by client application 100 a notification alert may be created such as, for example, a popup window. The user may select the phrasing of the alert or the part of the updated item he wishes to see in the popup window. This selection may be carried out through a filtering option at user interface 120. For example, if the selected channel is a sports news item list that has been updated, the user may choose to see the title of the new items updated on that list in the popup window. For CMCs 20 client application 100 may only check for a content modification and produce an alert when an update is identified.

Figure 4:
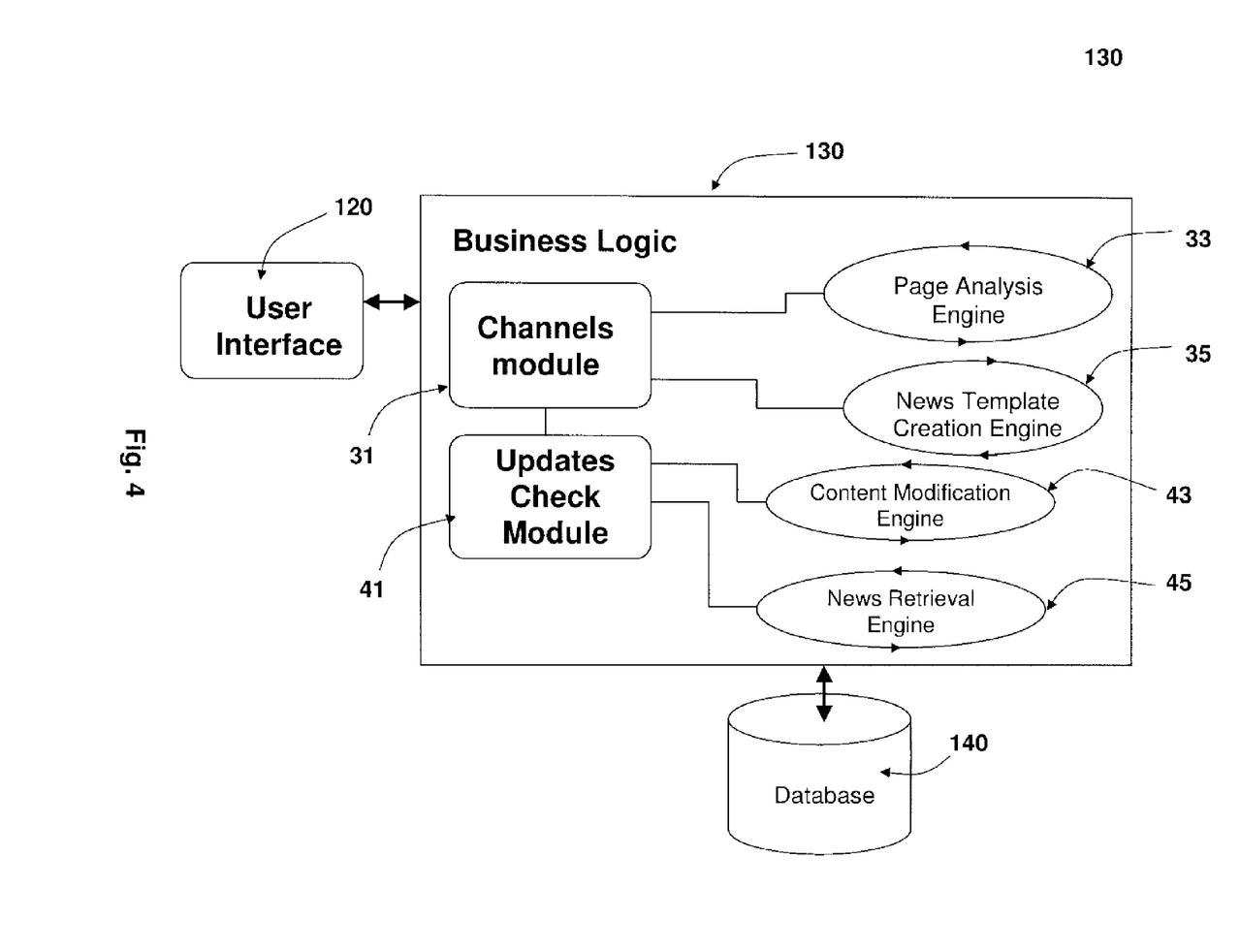
FIG. 4 is a schematic illustration of a client application, according to some embodiments of the present invention.

FIG. 4 schematically illustrates client application 100, according to some embodiments of the present invention. Client application 100 comprises:

user interface 120 that enables the user to select pages and pages' parts for update checks, display options of updates, set check-frequencies and channel managing, and notify the user of new updates;

business logic 130 that comprises:

a channel module 31 that enables analyzing of pages through page analysis engine 33, creation and sorting of channels, creation of archives, setting of updates check frequencies, selecting of channels for updates and creating templates for NCs 10 through a news template creation engine 35;

and an update-check module 41 that enables identification of updates according to the channel type and the users selected parameters, retrieval of pages from the network and from database 140 through a news retrieval engine 45, managing of an archive that comprises all the news-items' updates, and identification of CMC 20 updates through a content modification engine 43;

database 140 that enables storing of pages, templates and templates' related data.

According to embodiments of the present invention, when a user selects a page through user interface 120 through the NC 10 option, page analysis engine 33 analyzes the network page and outputs an analyzed page, by which the application is able to identify the fields and other parameters of the template. Following the analysis of the page, the user can create a news template, using a template wizard in user interface 120 The user may further create NCs 10 from the template using user interface 120.

According to embodiments of the present invention, channel module 31 may sort and process the channels. For example, channel module 31 may add, edit and delete NCs 10 and CMCs 20. Business logic 130 may include an archive manager for the managing of an archive of all news items of all channels selected by the user, allowing the user to search through the archive for items.

According to embodiments of the present invention, the archive may comprise an archive-filtering option, allowing the user to filter the display of news in the archive window according to a predefined list of archive-filters. For example, the archive-filters list may include filtering by keywords, a number of last updates, read and unread news, etc. The user may also be able to combine a number of filters, for example, filtering the archive to show only the ten last unread updated news items that include the keyword "Michael Jackson".

According to embodiments of the present invention, the archive may save items in database 140 for a predefined default time interval "$T_o$" and remove the item from archive once that interval is passed. Additionally or alternatively, the system may allow the user to define at least some of the time intervals of the updated news items.

Figure 5:
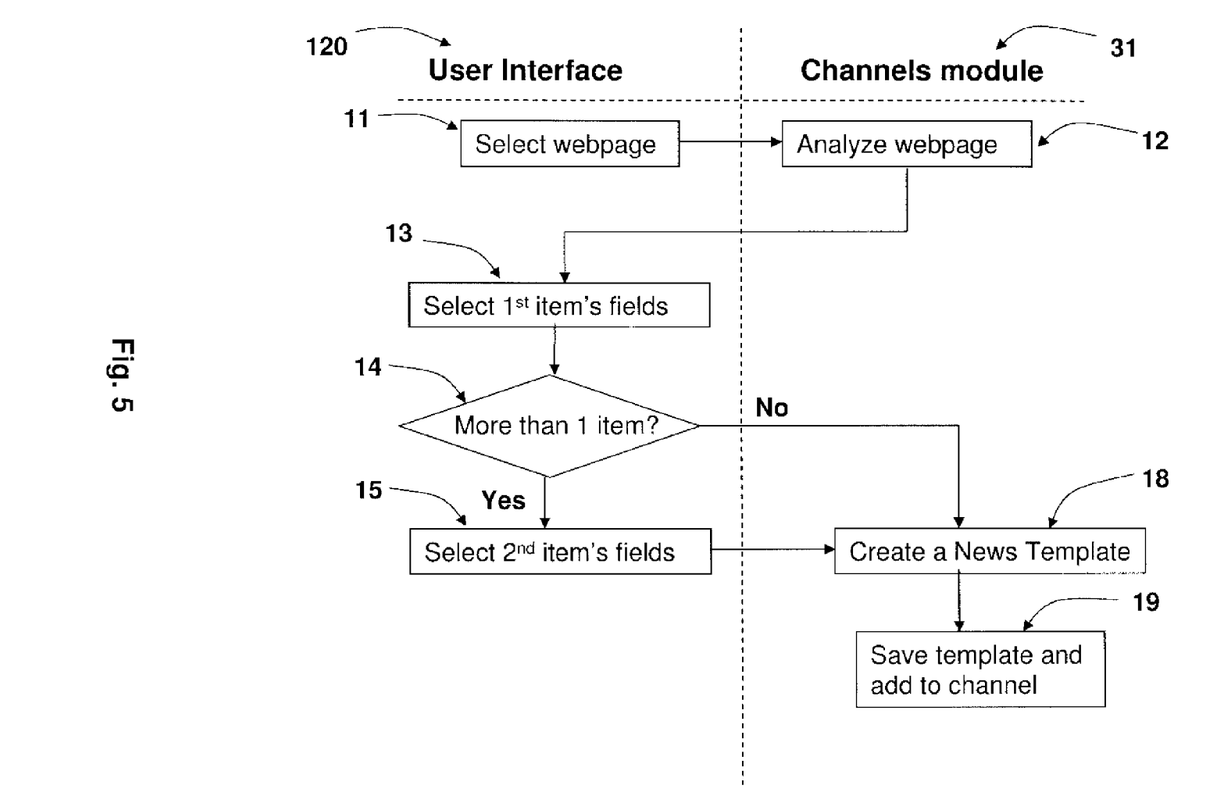
FIG. 5 is a flowchart that schematically illustrates a method for creating a news template, according to embodiments of the present invention.

FIG. 5 schematically illustrates a method for creating a new template, using client application 100, according to embodiments of the present invention. The method comprises the steps of:

select a page 11, where the user may select a page through user interface 120;

analyze page 12, where page analysis engine 33 analyzes the page to allow further creation of templates by identifying the item lists, the items and fields as well as the code-properties of the fields;

select the first item's fields 13, where the user may select the item's fields choosing from a predetermined list of fields, such as: title, summary and the like;

if there is more than one item of the same item list in the page 14—the user may be requested to select the fields of a second item 15—from the items of the selected page, the fields available for choosing in the second item may be only those that were selected in the first item—meaning that the first and second item have the same selected fields;

upon selecting one or two items, channel module 31 may create a news template 18, using news template creation engine 35;

the template may be saved 19 once it is created, along with template related data such as the page locator, for example, a webpage uniform resource locator (URL), the fields and filters that were selected etc.

According to embodiments of the present invention, the field types may be predetermined by the system, where the user may be provided with a list of fields such as: headline, title, summary, hyperlinks, date, author and the like. The list of optional fields to select from may be followed by a brief description of the field. Once the user selects the fields in the first item, the following item of the same page may only include fields that were selected in the first item and client application 100 will only present those fields as optional in the following items. The user may then select and mark the same fields of the first item. The selected fields may set the template for all the items of the same item list. The template creation enables identification of updates of new items in the same list, even if the number of items in the list is changed according to the updating of list. For example, the user marks two fields from a list of titles and abstracts of five items in a home page of a news website. Once the user selects the fields of the first two items the template may be set to check updates according to the marked fields. If at least one of the titles or abstracts will be updated, client application 100 may notify the user regarding the new update. If a sixth item will be added to the list, the system may still be able to recognize the update regardless of the variations in the number of items of the same list. The template may enable locating the position of the item list in the page.

According to embodiments of the present invention, updates-check module 41 may check the network pages for updates in predetermined frequencies, for example, updates of NCs 10 may be checked more frequently than CMCs 20, where NCs 10 updates may be checked every $t_1$ time interval and CMCs 20 updates may be checked every $t_2$ interval.

According to embodiments of the present invention, client application 100 may further include an option of an "advanced mode". The user may enter this mode through user interface 120. The advanced mode may comprise additional options such as, for example, setting of the updates checks frequencies for each channel, setting of the popup alert and its content message, setting up the filters and the like.

According to embodiments of the present invention, notification regarding a new identified update of a NC 10 items, may be carried out through a popup window, for example. The system may be set to display the title of the updated item in the popup window. The system may further enable linking from the popup to the archive window to view more parts of the item. Additionally or alternatively, the system may enable notification filtering for each channel by selecting notification-filters out of a predefined list of filtering options. For example, the user may choose to receive popup notifications only for items that include a chosen keyword.

According to embodiments of the present invention, all updated items that are identified by client application 100 may be saved in the archive, including the ones that are not included in the notification-filtering.

Figure 6:
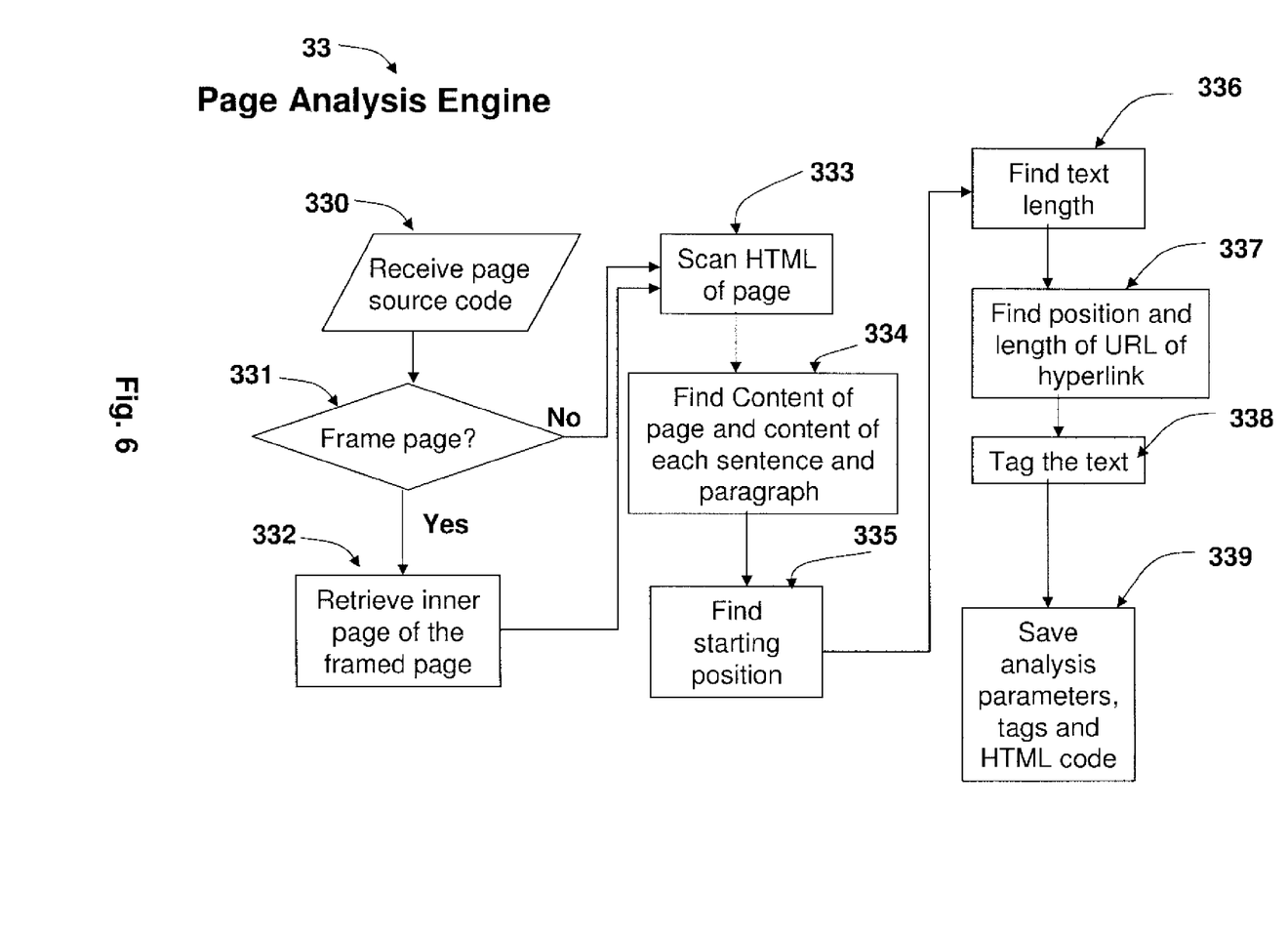
FIG. 6 is a flowchart that schematically illustrates a process of a page analysis, according to some embodiments of the present invention.

FIG. 6 schematically illustrates process of a page analysis, using page analysis engine 33, according to some embodiments of the present invention. Page analysis engine 33 may receive the source code of the network page 330 through user interface 120. Each page may be encoded as a Hyper Text Markup Language (HTML) document, from which page analysis engine 33 may read. Page analysis engine 33 may check whether the page contains frames 331, if so—page analysis engine 33 may recursively analyze each inner-page (frame) within the page it analyzes by retrieving the inner page of the framed page 332. If the page is not frame-set, or once the HTML code is retrieved, the page's HTML code may be scanned 333. At the next steps page analysis engine 33 may find the content text of each sentence or paragraph of the page 334, the starting position of the text 335 and the length of the text 336. If the sentence or paragraph is a hyperlink page analysis engine 33 may find the length and position of the URL address that is connected to it 337. The HTML code may further he tagged 338 to allow the user to mark fields and items within the page and to allow client application 100 to receive the parameters that were analyzed for the text that has been marked by the user. At the final step of the process, the HTML code of the page may be saved 339 along with its associated analysis parameters and tags. The parameters may be, for example, the text length, the text's starting position, all the URL addresses that are included in the text, the items and fields of the page and the like. Once a page is analyzed—user interface 120 may provide the user with tools that may allow him to choose items and fields from the analyzed page. The analyzed page may appear substantially similar to the original page.

Figure 7:
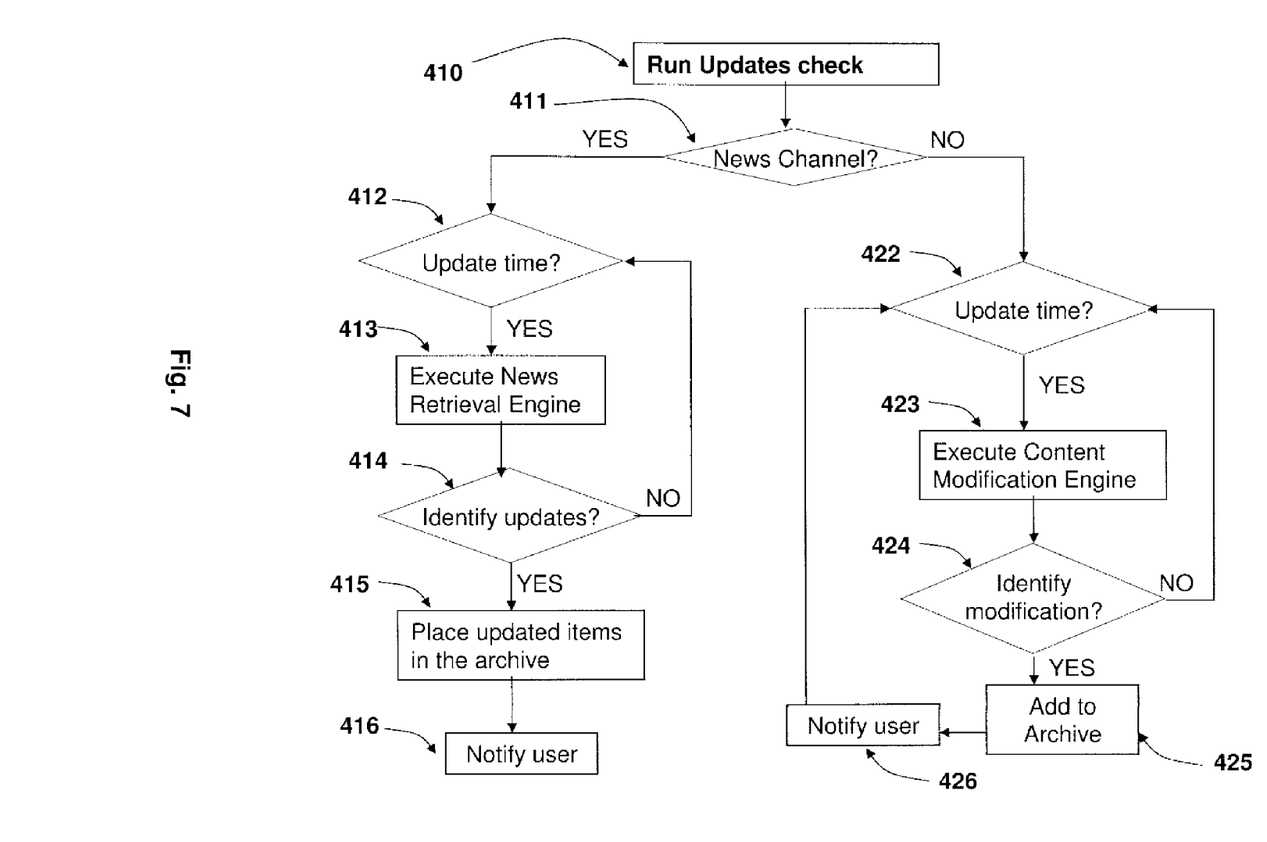
FIG. 7 is a flowchart that schematically illustrates a process of an updates check, according to some embodiments of the present invention.

FIG. 7 schematically illustrates updates check unit's 41 process, according to some embodiments of the present invention. Client application 100 enables update checks module 41 to run continuously on the client's desktop. According to embodiments of the present invention, update check module 41 may continuously run through the channels 410. For each channel, the updates check module 41 identifies the channel type 411. For each channel type, updates check unit 41 checks for updates in a default frequency or a frequency chosen by the user. For news channels 10, updates check unit 41 executes the following steps within each time-interval that has been set for NCs check 412: execute news retrieval engine 413—where news retrieval engine 45 retrieves previous update of news items list according to the template that relates to the same list, reads the items, identifies the updated items and returns the new updated items of the item list. If news retrieval engine 45 has identified updated items 414—the identified updated items may then be placed in the archive 415, and the user may be notified 416 regarding the new identified updates through the notification alert. For content modification channels 20, updates check unit 41 executes the following steps within the time-interval that has been set for CMCs check 422: execute content modification engine 423—where the content modification engine 43 distinguishes between the content part of a page and the "irrelevant" parts of the page. The irrelevant parts may be parts that are updated more frequently than the content itself. For example, irrelevant parts may be the date text, banners and images that are not related to the content of an article, links, etc. Content modification engine 43 compares the last saved update content with a new content of the same page to check for updates. If an update has been identified 424—the new updated content or the network address of updated content page may be added to the archive 425, and a notification alert may be executed 426. The notification alert may be a voice message, a popup message and the like.

According to some embodiments of the present invention, the user may be enabled to filter the archive's display list—choosing an archive-filter out of a prelisted filtering options displayed in user interface 120. The archive-filter options may be, for example, filtering by keywords, last several updates, etc. Updates that do not apply to the archive-filtering condition may be saved in database 140 but not displayed in the archive's display.

According to some embodiments of the present invention, updated items may be saved in the archive for limited time-periods, according to the systems definitions. For example, the system may be defined to save each update for three days and delete the update once seventy-two hours have passed. As another example, the system may be defined to delete the oldest update, once the list of updates in the archive have reached a predefined number—for example, once reaching a hundred updates.

Figure 8:
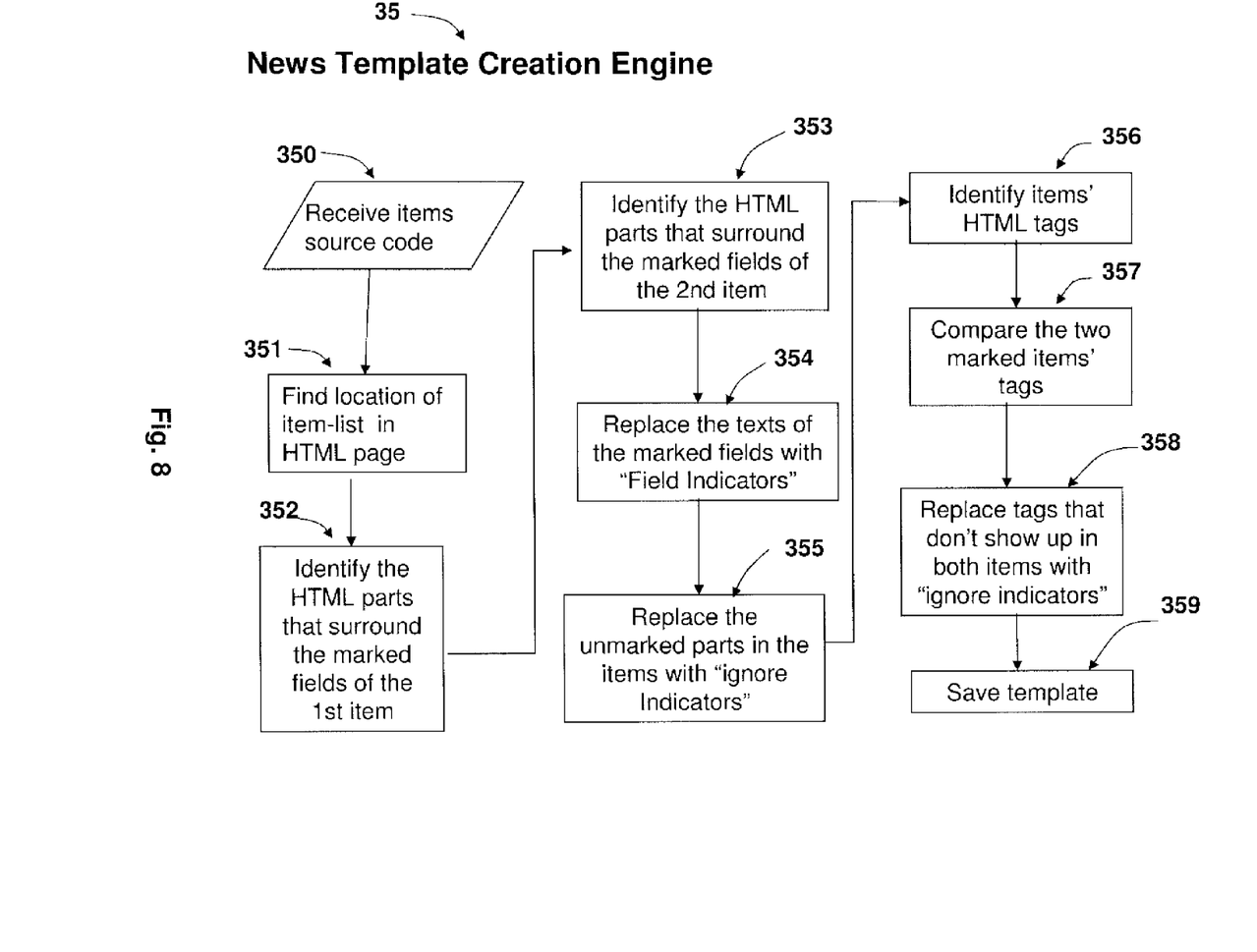
FIG. 8 is a flowchart that schematically illustrates a process of creating a news template, according to some embodiments of the present invention.

FIG. 8 is a flowchart that schematically illustrates a process of creating a news template, using news template creation engine 35, according to some embodiments of the present invention. News template may be created after the user has marked the fields of the first and the second item. News template creation engine 35 may process the following steps:
  receive the source code of the marked items in the item list 350;
  find the location of the entire item list in the page 351;
  identify the HTML parts that surround the marked fields of the first item 352;
  identify the HTML parts that surround the marked fields of the second item 353;
  Replace the content-text of the marked fields with "Fields Indicators" (FI) 354; the FIs may indicate the field type, for example: title, summary etc.
  Replace the unmarked parts of the items with "Ignore Indicators" (II) 355;
  Identify item's HTML tags 356;
  Compare the HTML tags of the first and the second item 357;
  Replace the HTML tags that do not appear in both items with II 358;
  Save template 359 in database 140.

According to embodiments of the present invention, templates created by users may be saved, copied and passed to other users. If the same page-template is copied and passed—the page may only be analyzed once for a multiplicity of users and client applications 100 to use. For example, client application 100 may be seated at the network websites and page's owners, where those owners may analyze the pages and create at least some of the templates for the users. Additionally or alternatively, the same analyzed page may be used for the creation of a multiplicity of templates for items lists of the same page, eliminating the need to analyze the same page to create each template. For example, a webpage that comprises three item-lists. If the user wishes to create templates for two of the three lists, for example, once the page is analyzed and once the first template is created, the system may provide the user with a selection option to create another template.

Figure 9:
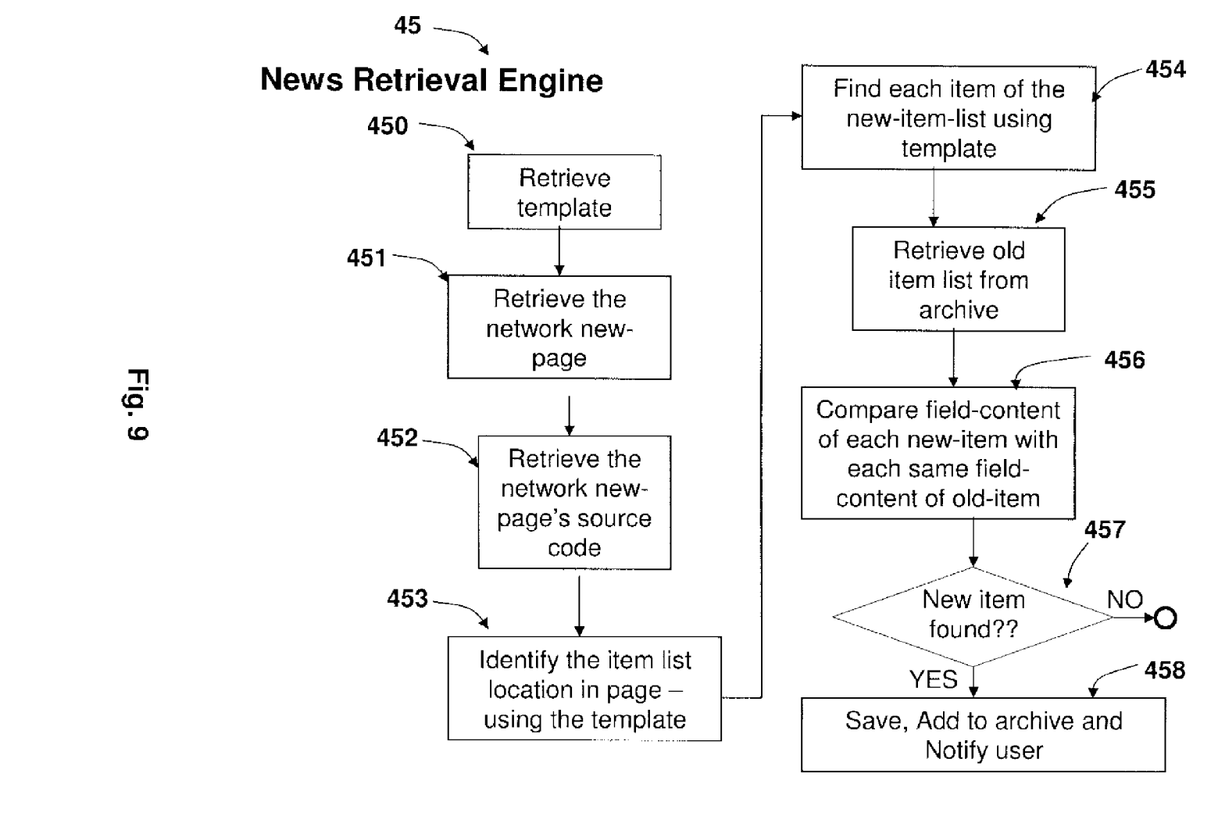
FIG. 9 is a flowchart that schematically illustrates a process for update checking of a news channel. according to some embodiments of the present invention.

FIG. 9 is a flowchart that schematically illustrates a process for update checking of an item list of NC 10, using news retrieval engine 45, according to some embodiments of the present invention. The process comprises the following steps:
  retrieving the template of a specific saved "old item list" of a specific channel 450;
  retrieving the network "new-item-list" according to sub-NC 10 saved URL 451; where an "old item list" refers to the saved item-list of the last update related to the template and "new-item-list" refers to the last item-list of the same template that have been retrieved.
  retrieving the new-item-list HTML source code 542—to enable comparison the old item list;
  identifying the new item list location 453—using the template;
  find each item of the new-item-list 454;
  retrieve old-item list and its old-items 455;
  compare each field of each item of the new-item-list with each field of each item of the old-item-list 456, to identify new updated items.
  If a new item is found 457—the new item and item list may be saved and added to the archive 458. Additionally, a notification message may be executed to notify the user regarding a new updated item.

If no new item is found 457—the session may be ended until the next updates check regarding the specific template.

According to embodiments of the present invention, once a new item is found 457—update check module 41 may rearrange the archive, according to preset definitions. For example, once a new item is added the oldest updated new item in the archive may be removed, or the oldest new item in the archive that belongs to the same template, etc. Additionally, the new item list may be saved along with the old item list—creating a new item list. The new item list may be used for the next updates check.

Figure 10:
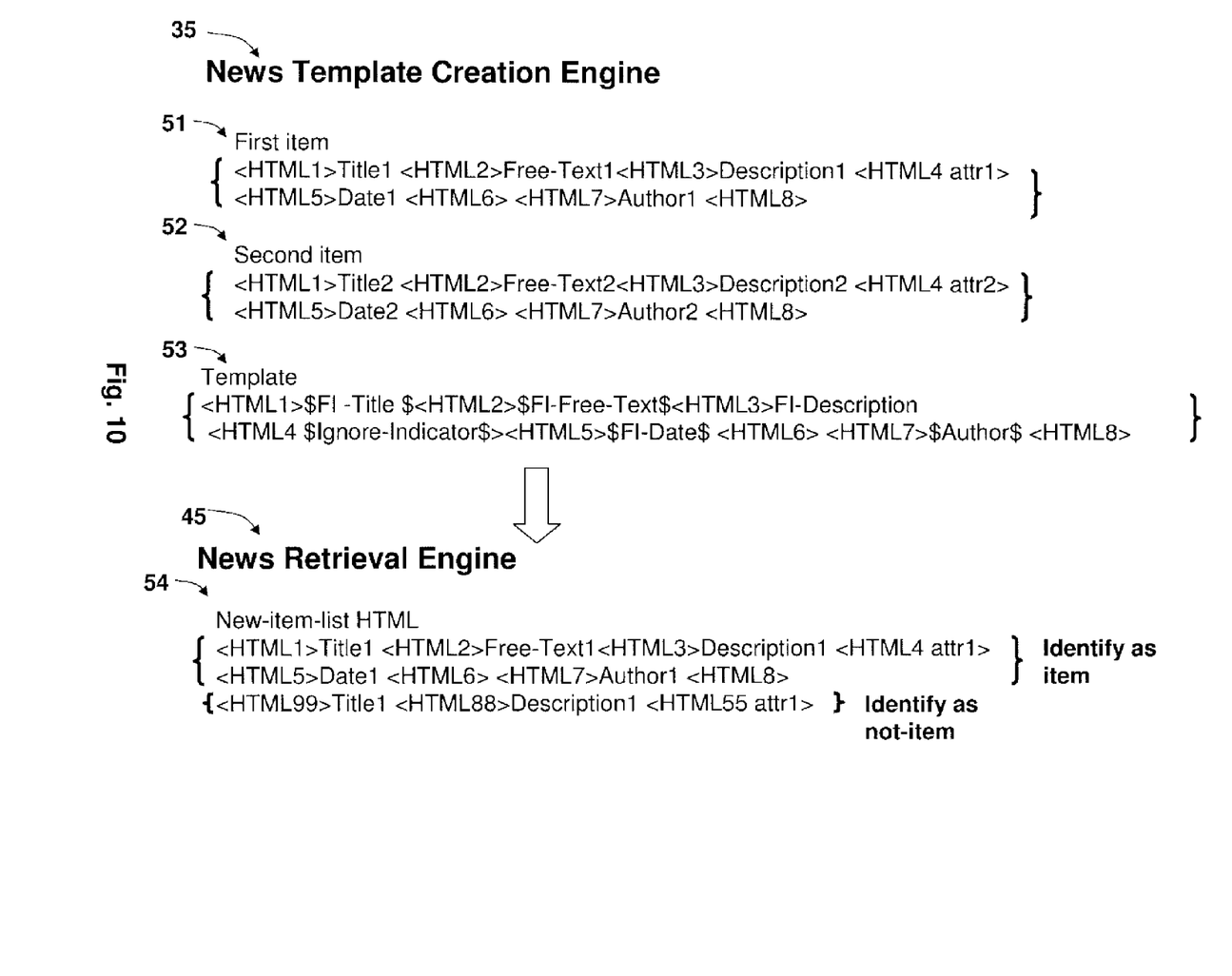
FIG. 10 is a schematic illustration of the HTML code reading for the creation of a template and the identification of a news item, according to some embodiments of the present invention.

FIG. 10 schematically illustrates an example for an HTML code reading for the creation of a template and the identification of a news item, according to some embodiments of the present invention. Once the user marks the fields of the first item 51 and the second item 52, the news template creation engine 35 enables identifying those text lines and define them as fields. For example, title, free-text, description, and the like, as illustrated in FIG. 10. The HTML parts that are not equal in both the first and the second item—such as "attr1" and "attr2", as exemplified in FIG. 10—the system may ignore when reading the new-item-list according to the template. To create the template 53—the equal HTML code parts will remain in the template, the fields that are actual text code in the item list, may be replaced with a Field Indicators (FI) and the unequal HTML parts may be replaced with an Ignore-Indicator (II) to indicate that these parts will not be used in comparing the template with items of the new-item-list. When checking for updated in a new-item-list related to, for example, the template that was specified.

FIG. 10, news retrieval engine 45 may compare the template with the new network page—to find the template-related items and the new-item-list 54. For example, if the HTML code is not equal to the first HTML code of the new item, news retrieval engine 45 may identify it as "not-item". If the HTML as well as the fields' parts of the template and the parts' order match to those of the page part, regardless of HTML parts marked as Ignore-Indicators, news retrieval engine 45 may identify this part as an "item".

According to embodiments of the present invention, the process for update checking of an item list may be executed in different frequencies—for each template, according to frequencies defined by the system, or according to frequencies defined by the user. Client application 100 may have a default updates check-frequencies for the channel. Client application 100 may further enable a frequencies-setup option in the advanced mode option, where the frequency setup option may enable the user to set specific update check frequency for each chosen template of an item list or a channel.

According to preferred embodiments of the present invention, news template creation engine 35 and page analysis engine 33 may enable identifying and reading of scripts such as, for example, Java scripts, in the page's HTML code, as well as other not-well-formatted parts of the page's HTML code.

While the invention has been described with respect to a limited number of embodiments, these should not be construed as limitations on the scope of the invention, but rather as exemplifications of some of the preferred embodiments. Those skilled in the art will envision other possible variations, modifications, and applications that are also within the scope of the invention. Accordingly, the scope of the invention should not be limited by what has thus far been described, but by the appended claims and their legal equivalents.

What is claimed is:

1. A method of monitoring updated content items in web pages, the method comprising:
    analyzing a web page, to determine a structure of the web page in view of its respective source code;
    converting the web page into user selectable form, such that any presented portion of the web page is mapable to a respective portion of the source code, responsive to a user selection of the presented portion of the web page;
    determining in the source code of the webpage a template of a selected content item in the web page, responsive to a selection of one or more fields by the user, wherein the fields are regions in the web page that include at least a portion of content in the web page, wherein the selected content item includes the selected fields and the template includes structure and layout of the selected content item presented in the web page excluding actual content of the fields, such that the template of the selected content item can be compared with all content items on the webpage regardless of their location and actual content to determine those that match the structure and layout of the selected content item;
    scanning an updated source code of the web page to detect each of the all content items in the web page matching the template of the selected content item in the source code;
    monitoring contents of the detected content items in the web page; and
    updating a display with the detected content items for review by the user;
    wherein at least one of: the analyzing, the converting, the determining, the scanning, and the monitoring are executed by a processor.

2. The method of claim 1, wherein the analyzing is carried out by a client application that is installed in the user's computer and connects to a server through a communication network.

3. The method of claim 2, wherein the client application enables the user to distinguish between at least two types of web page parts defined as channels: news channels (NC) and content modification channels (CMC).

4. The method of claim 1 wherein the analyzing of the web page is carried out by:
    identifying HTML code of said web page and distinguishing between the HTML tags and content of said code;
    identifying of scripts within the HTML code of the web page;
    identifying item lists, items and fields of said web page,
    wherein the analyzing of said web page enables selecting of the items and fields to create the template.

5. The method of claim 1, wherein upon selecting the fields and content item, the determining of the template is carried out by:
    identifying HTML code and distinguishing between HTML tags and the content of the selected fields;
    identifying of scripts within the HTML code of the selected fields; and identifying and marking HTML parts of said fields that define the template,
    wherein said HTML parts are saved as the template along with a locator of the web pages.

6. The method according to claim 1, further comprising displaying the detected matching content items in a sortable list separate from the web page.

7. The method according to claim 6, further comprising excluding from the sortable list fields of the content items that were not selected by the user.

8. A system for monitoring updated content items in web pages, the system comprising:
- a processor;
- a web page analyzer configured to analyze a web page, to determine a structure of the web page in view of its respective source code;
- a user interface configured to: convert the web page into user selectable form, such that any presented portion of the web page is mapable to a respective portion of the source code, responsive to a user selection of the presented portion of the web page; and
- a business logic unit configured to: (i) determine in the source code of the web page a template of a selected content item in the web page, responsive to a selection of one or more fields by the user, wherein the fields are regions in the web page that include at least a portion of content in the web page, wherein the template includes structure and layout of the selected content item presented in the web page such that the template of the selected content item can be compared with all content items on the webpage regardless of their location and actual content to determine those that match the structure and layout of the selected content item; (ii) scan an updated source code of the web page to detect each of the all content items in the web page matching the template of the selected content item in the source code; (iii) monitor content of the detected matching content items, independently of an actual selection of the detected content items in the web page; and (iv) update a display with the detected content items for review by the user; wherein the web page analyzer, the user interface, and the business logic unit are executed by the processor.

9. The system according to claim 8, wherein the system is installed in a user's computer and connects to a server through a communication network, wherein said server comprises a server application for storing information relating to client applications of the user and for automatically updating the users' client applications in case a new version of software is issued.

10. The system according to claim 8, wherein the user interface enables the user to distinguish between at least two types of web page parts defined as channels: news channels (NC) and content modification channels (CMC).

11. The system according to claim 10, wherein the user interface allows the user to create categories of NC and categories of CMC, where a NC category includes at least one NC and a CMC category includes at least one CMC.

12. The system according to claim 11, wherein the channels are combined into channel groups that enable grouping of different channels and different channel types into the same channel groups.

13. The system according to claim 11, wherein the NC comprises at least one datasource, wherein a data-source is at least one item list comprising at least one item.

14. The system according to claim 13, wherein items and fields of the web page are identified by the page analyzer by identifying HTML code and scripts of the web page.

15. The system according to claim 11, wherein the NC comprises at least one data-source, wherein a data-source is at least one Rich Site Summary (RSS) feed.

16. The system according to claim 8, wherein the user interface replaces fields that are text code in an item list with Field Indicators (FI) to create the template.

17. The system according to claim 8, wherein the business logic unit is further configured to periodically repeat the scanning of the updated source code of the web page and monitoring of the contents of the detected matching content items.

18. The system according to claim 8, wherein the business logic unit further comprises a channels module and an updates check module, wherein the channels module is configured to create and sort channels, create archives, set updates check frequencies and select channels for updates and comprises a page analysis engine configured to analyze web pages and a news template creation engine configured to determine the template, wherein the updates check module is configured to enable identification of updates according to channel type and user selected parameters and manage an archive comprising all news-item updates and comprises a news retrieval engine configured to retrieve pages from the network and from a database and a content modification engine configured to detect content items matching the template and monitor the content of the matching content items and identify CMC updates.

* * * * *